O. C. HOUGHTON.
BEARING WHEEL FOR TRACTION ENGINES.
APPLICATION FILED OCT. 8, 1914.
1,137,974.
Patented May 4, 1915.
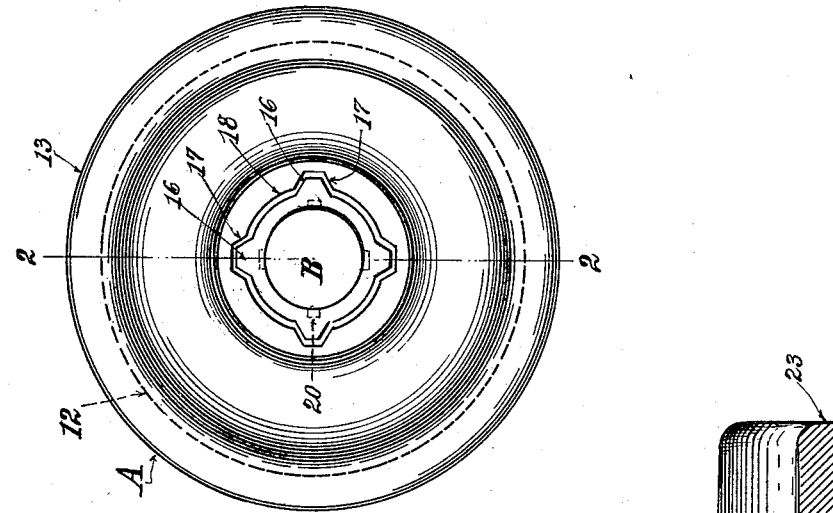
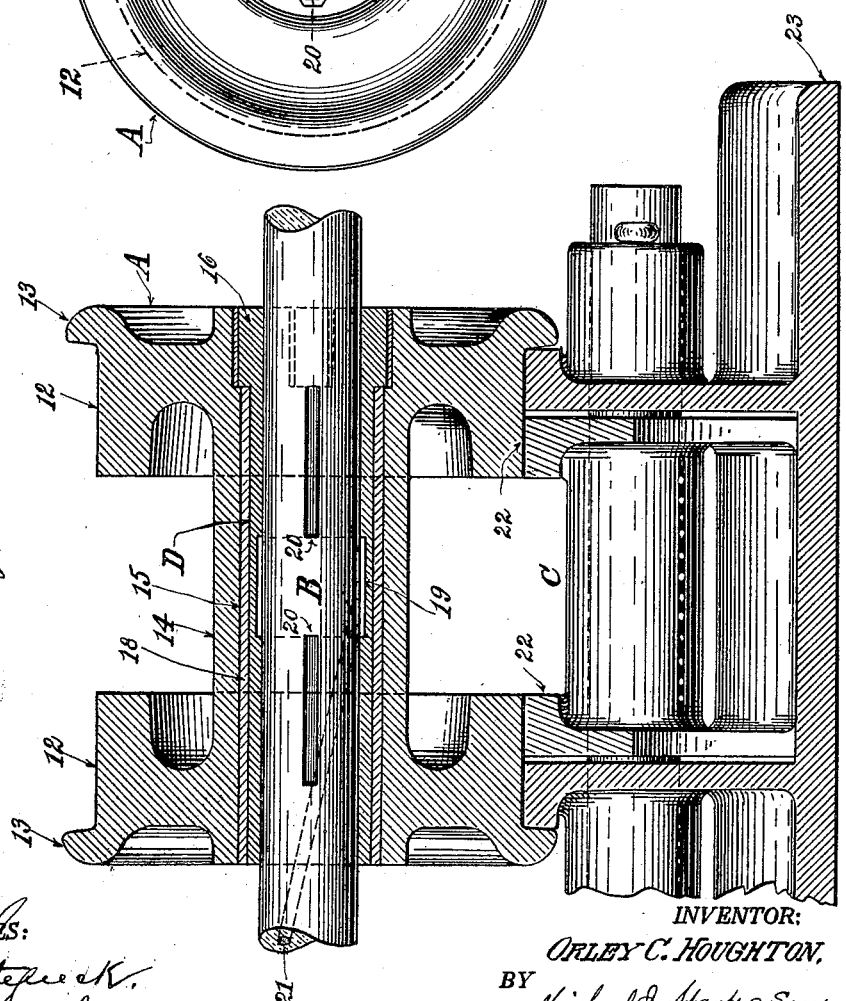
WITNESSES:
INVENTOR:
ORLEY C. HOUGHTON,
BY
Michael J. Stark & Sons
ATTORNEYS.
THE NORRIS PETERS CO., PHOTO-LITHO., WASHINGTON, D. C.

UNITED STATES PATENT OFFICE.

ORLEY C. HOUGHTON, OF CHICAGO, ILLINOIS, ASSIGNOR TO BULLOCK TRACTOR COMPANY, OF CHICAGO, ILLINOIS, A CORPORATION OF ILLINOIS.

BEARING-WHEEL FOR TRACTION-ENGINES.

1,137,974.  Specification of Letters Patent.  Patented May 4, 1915.

Application filed October 8, 1914. Serial No. 865,677.

*To all whom it may concern:*

Be it known that I, ORLEY C. HOUGHTON, a citizen of the United States, and resident of Chicago, in the county of Cook and State of Illinois, have invented certain new and useful Improvements in Bearing-Wheels for Traction-Engines; and I do hereby declare that the following description of my said invention, taken in connection with the accompanying sheet of drawings, forms a full, clear, and exact specification, which will enable others skilled in the art to which my said invention appertains to make and use the same.

This invention has general reference to bearing wheels, and particularly that class of wheels which run on the rails of endless tracks of traction engines. This class of wheels is nearly continuously running on sandy and gritty tracks and they are, therefore, rapidly worn and thus require more or less frequent renewal.

The object of my invention is to improve the quality and durability of said wheels and it, therefore, consists, essentially, in the novel and peculiar combination of parts and details of construction, as hereinafter first fully set forth and described and then pointed out in the claim.

In the drawings already mentioned which serve to illustrate this invention more fully and form a part of this specification, Figure 1 is a longitudinal sectional elevation of a pair of bearing wheels and the endless track band on which said wheels are constructed to run, the section being on line 2—2 of Fig. 2. Fig. 2 is an end view of one of said wheels.

While I have illustrated in these drawings a pair of bearing wheels and the endless track on which they are rotating, as an exemplification of the preferred embodiment of my said invention, I desire it to be understood that my said invention is capable of being embodied in other car, traction, and similar wheels.

In the drawings, A designates a pair of bearing wheels; B the axle for same, and C the endless track-band on which said bearing wheels are constructed to run. This pair of bearing wheels is preferably formed integrally in the process of casting and in order to attain the highest possible efficiency in these wheels I cast them in so-called white iron, a ferrous metal containing but a low percentage of graphite and but a trace of free carbon. This iron is so hard that it cannot be machined, or at best only with the greatest difficulty, and since boring these wheels in a machine, for the reception of an axle, is practically impossible, I form these wheels, comprising the tread-portions 12, flanges 13, and hub 14, with an axial bore 15, of greater diameter than the external diameter of the axle B, and place in this bore a bushing D, which I secure fixedly in said bore 15, as hereinafter to be more specifically pointed out. This bushing D, I produce in soft-metal, such as gray iron, steel, brass, bronze, etc., and in order to prevent its rotation in the bore of 15, I form at one end of said bushing radially projecting lugs, 16, and in one end of said bore 15 coacting recesses 17. These recesses are somewhat larger than the projections on the bushing, and the exterior diameter of said bushing is sufficiently smaller in diameter than the bore 15 so that the preferred method of fastening said bushing in the hub can be readily exercised, which method consists in pouring a readily fusible substance or metal capable of expanding in cooling in the space 18, surrounding said bushing, Babbitt metal, sulfur and other substances being suitable for my purposes. A wheel, after having the bushing properly secured in its bore may now be chucked in a lathe or other boring machine and the bushing bored to receive the axle thereby insuring concentricity of the latter, with the tread of the wheel. Lubrication of the wheel upon the axle in case where the former is constructed to rotate on the latter, is afforded by producing, in the bore of the bushing, approximately medially thereof, an annular groove 19, and in the periphery of the axle longitudinal oil-grooves 20, the axle B being bored to afford a passage 21, which leads to the exterior or terminal of said axle and to which a lubricator, not shown, may be attached. The twin bearing wheels are constructed to run on the lower stretch of a pair of upwardly extending tracks, 22, rising from the plates or shoes, 23 of an endless traction band, which latter band, not forming a part of this application, needs not be here described in detail.

I now desire to call attention to the fact that wheels of the nature described are comparatively cheap, because the metal of the entire body of the wheel is but a trifle more expensive than common gray iron, and because the core of the wheel and the exterior of the bushing require no labor to fit them for assembling so that a wheel having the hardness and wearing qualities of my wheel, which are many times that of a common gray iron, or a chilled-tread wheel, is at the end much cheaper than any other wheel with which I am acquainted.

While I prefer white iron for the body of the wheel owing to its extreme hardness combined with cheapness, I can also readily employ manganese steel, which likewise is not readily machined the production of which is, however, much higher than that of white iron.

The wheel body described is practically indestructible, and only the bushing needs renewal which, by my method of securing the bushing in the wheel-body, can be readily accomplished by melting the filling material out of said wheel body, which material can be reused without loss, so that the renewal of a bushing is an inexpensive matter.

I have heretofore described this invention with special reference to traction wheels constructed to rotate on a fixed axle, but it is evident that the same wheel may have its axle fixedly secured in the bushing without changing or modifying my process of producing the same. It is also capable of being employed in case a fixed axle is desired to be permanently associated with the wheel body. In the latter case I place a suitable axle of a softer metal in the mold in which the wheel is to be produced and then pour the wheel in white iron, which will so tightly shrink, in cooling on the axle, as to permanently retain the same in the body of the wheel. If this axle is left slightly larger in diameter than its final size, it can be readily turned in a lathe to insure concentricity with the tread of the machine. These, and other modifications of my invention which will readily suggest themselves to a person skilled in the art to which my said invention appertains, may be resorted to without departing from the scope of my invention as set forth in the subjoined claim.

Having thus fully described my invention, and ascertained the best method and means to carry the same into effect, I claim as new and desire to secure to myself by Letters Patent of the United States.

A wheel of the nature described, comprising a body produced from a metal so hard as to be practically incapable of being machined, said body having a central bore, a series of recesses at one end of said bore, a bushing, said bushing being smaller in external diameter than the bore in said body, laterally-projecting lugs at one terminal of said bushing, said lugs being constructed to coact with said recesses to prevent rotation of said bushing, and a lining between said bushing and the wall of said bore, constructed to removably retain said bushing in said bore, said lining being a readily fusible substance capable of being removed by melting, said bushing being constructed of a material capable of being machined.

In testimony that I claim the foregoing as my invention I have hereunto set my hand, in the presence of two subscribing witnesses.

ORLEY C. HOUGHTON.

Witnesses:
MICHAEL J. STARK,
JOHN B. SMITH.

Copies of this patent may be obtained for five cents each, by addressing the "Commissioner of Patents, Washington, D. C."